US012789174B2

United States Patent
(12) United States Patent
Feng et al.

(10) Patent No.: US 12,789,174 B2
(45) Date of Patent: Nov. 10, 2026

(54) MOLECULAR SIEVE SCR CATALYST AND PREPARATION METHOD

(71) Applicant: SINOCAT ENVIRONMENTAL TECHNOLOGY CO., LTD., Chengdu (CN)

(72) Inventors: Xi Feng, Chengdu (CN); Zhimin Liu, Chengdu (CN); Rui Sun, Chengdu (CN); Yun Wang, Chengdu (CN); Yanhua Zhang, Chengdu (CN); Ruifang Wang, Chengdu (CN); Kuan Wei, Chengdu (CN); Haikun Chen, Chengdu (CN); Yineng Lai, Chengdu (CN); Yaoqiang Chen, Chengdu (CN); Yun Li, Chengdu (CN); Qizhang Chen, Chengdu (CN)

(73) Assignee: SINOTECH COMPANY LIMITED, Chengdu (CN)

( * ) Notice: Subject to any disclaimer, the term of this patent is extended or adjusted under 35 U.S.C. 154(b) by 497 days.

(21) Appl. No.: 18/569,703

(22) PCT Filed: May 26, 2022

(86) PCT No.: PCT/CN2022/095100

§ 371 (c)(1),
(2) Date: Dec. 13, 2023

(87) PCT Pub. No.: WO2022/262543

PCT Pub. Date: Dec. 22, 2022

(65) Prior Publication Data

US 2024/0226861 A1 Jul. 11, 2024

(30) Foreign Application Priority Data

Jun. 17, 2021 (CN) ......................... 202110673384.3
Sep. 9, 2021 (CN) ......................... 202111056248.6

(51) Int. Cl.
*B01J 29/72* (2006.01)
*B01J 37/02* (2006.01)
(Continued)

(52) U.S. Cl.
CPC ......... *B01J 29/723* (2013.01); *B01J 37/0215* (2013.01); *B01J 37/08* (2013.01);
(Continued)

(58) Field of Classification Search
CPC ..... B01D 53/8628; B01J 29/723; B01J 29/76; B01J 29/763; B01J 35/56; B01J 37/0215;
(Continued)

(56) References Cited

U.S. PATENT DOCUMENTS

2024/0033717 A1* 2/2024 Yang .................. B01D 53/9418

FOREIGN PATENT DOCUMENTS

CN 106984357 A 7/2017
CN 110479359 A 11/2019
(Continued)

OTHER PUBLICATIONS

International Search Report, International Appl. No. PCT/CN2022/095100, dated Jul. 28, 2022; China National Intellectual Property Administration, Beijing, China.

*Primary Examiner* — Brian A McCaig
(74) *Attorney, Agent, or Firm* — Central California IP Group, P.C.; Andrew D. Fortney

(57) ABSTRACT

The invention discloses a molecular sieve SCR catalyst and a preparation method, the preparation method comprising the steps of: (1) heating deionized water to 60-90 °C, and adding a soluble copper salt and an additive to stir and dissolve the same to prepare a copper solution; (2) heating the deionized water to 20-90 °C, adding a soluble yttrium salt to dissolve the same, and when maintaining the temperature, adding a molecular sieve with a silicon-aluminum ratio of ≤24 and stirring the same; when maintaining the temperature, adding a copper solution and stirring to perform ion exchange; (3) cooling the solution after the ion exchange in step (2), adding an adhesive, stirring and ball-milling the mixture, and standing to obtain a slurry; (4) coating the slurry onto a support, drying and then calcining to obtain a molecular sieve SCR catalyst. The catalyst prepared according to the present invention by using a small
(Continued)

pore molecular sieve material with a lower silicon-aluminum ratio and adding yttrium as a second active component exhibits excellent catalytic activity for $NO_x$ at low and high temperatures, and has a wide active temperature window, high hydrothermal stability and good hydrocarbon resistance.

10 Claims, 3 Drawing Sheets

(51) Int. Cl.
*B01J 37/08* (2006.01)
*F01N 3/20* (2006.01)

(52) U.S. Cl.
CPC ......... *F01N 3/2066* (2013.01); *B01J 2229/18* (2013.01); *F01N 2570/14* (2013.01)

(58) Field of Classification Search
CPC ...... B01J 37/0246; B01J 37/08; B01J 37/082; B01J 37/30; B01J 2229/18; B01J 2229/183; F01N 3/2066
See application file for complete search history.

(56) References Cited

FOREIGN PATENT DOCUMENTS

| | | | |
|---|---|---|---|
| CN | 110681412 | A | 1/2020 |
| CN | 111135860 | A | 5/2020 |
| CN | 112156808 | A | 1/2021 |

* cited by examiner

MOLECULAR SIEVE SCR CATALYST AND PREPARATION METHOD

TECHNICAL FIELD

The present invention relates to the technical field of catalyst preparation, and in particular to a molecular sieve SCR catalyst and a preparation method.

BACKGROUND ART

Nitrogen oxide ($NO_x$, $NO+NO_2$) in the atmosphere is one of the main pollutants, which is an important cause of acid rain, photochemical smog and haze, directly threatens the ecological environment and causes serious harm to human health. Its most direct and main source is the combustion of fossil fuels. With the continuous development of automotive industry, the volume of various types of motor vehicles is increasing rapidly, and the exhaust gas from engine fuel consumption emissions contains $NO_x$, which is also an important cause of serious air pollution. Therefore, the catalytic purification of $NO_x$ in the exhaust gas of motor vehicles attracts wide attention all over the world, especially for diesel vehicles with large $NO_x$ emissions. Emissions from diesel heavy vehicles will begin to implement National VI (a) on Jul. 1, 2021 and will implement National VI (b) on Jul. 1, 2023, with increasingly stringent conversion capacity requirements for $NO_x$.

The ammonia selective catalytic reduction technology ($NH_3$-SCR) is one of the most effective flue gas denitration technology which has been commercialized at present, and its principle is to selectively reduce toxic $NO_x$ into non-toxic $N_2$ and $H_2O$ with $NH_3$ as a reducing agent. Vanadium-based catalysts and copper-based catalysts are mainly used for $No_x$ catalysts for diesel engine exhaust purification. Among them, the copper-based catalysts have better low-temperature performance and temperature window, no biological toxicity, and have more advantages in environmental protection. Thus, they have gradually become the mainstream catalysts for diesel engine exhaust purification. Since CN 102974391A discloses that a metal-supported CHA small pore molecular sieve has good performance for $NH_3$-SCR, a large number of $NH_3$-SCR catalysts based on small pore molecular sieves have been successively developed. Cu-SSZ-13 with a small pore structure shows excellent catalytic activity for $NH_3$-SCR. The molecular sieve with a higher molar ratio of $SiO_2$ to $Al_2O_3$ (silicon-aluminum ratio for short, the same below, usually referring to silicon-aluminum ratio of ≥25) shows better hydrothermal stability for a Cu-SCR catalyst, which has been successfully commercialized. However, there are still some problems such as insufficient reaction temperature window and poor hydrocarbon resistance, hydrocarbon poisoning is easy to occur, and its production cost is high, which cause many limitations in practical application.

In order to increase the low-temperature activity of the catalyst, the low temperature is generally improved by increasing the copper content. However, as the copper content increases, the high-temperature performance and hydrothermal stability of the catalyst deteriorate, and it is still difficult to meet the increasingly stringent emission requirements. CN 102215960 A discloses a Cu-based CHA molecular sieve catalyst with a silicon-aluminum ratio of less than 15, which has a $NO_x$ conversion of up to about 70% at 200 °C. However, the exhaust temperature of diesel vehicles may be less than 200 °C under practical conditions, and the $NO_x$ conversion rate may not meet the requirements of the new standard for $NO_x$ emission. Patent CN 111135860 A discloses a Cu-SSZ-13 catalyst with a silicon-aluminum ratio of 3-5, which is prepared by using Cu-TEPA as a template, directly adding Cu-SSZ-13 during the synthesis of a molecular sieve, and then washing part of the non-framework Cu by an ammonium salt or a dilute acid solution and then exchanging with the rare earth metal, thereby obtaining a Cu-CMA-13 catalyst with a relatively good hydrothermal stability and a low silicon-aluminum ratio. Although the prepared catalyst has a very good temperature window and hydrothermal stability, the hydrothermal synthesis of Cu-SSZ-13 using Cu-TEPA as a template has high technical requirements. It is difficult to ensure the batch consistency of product crystallinity in scale-up production. It is also difficult for general manufacturers to have the corresponding production technical conditions. Ammonium salt or dilute acid solution washing is used in the production process. This process is not only complicated, but also produces a large amount of industrial wastewater. Therefore, it is a problem in the art to reduce the source requirements of raw materials and maintain a higher hydrothermal stability performance while increase the catalyst reaction temperature window.

SUMMARY OF THE INVENTION

The object of the present invention is to provide a molecular sieve SCR catalyst and a preparation method thereof so as to overcome the problems of the copper-based catalysts of the prior art, such as low conversion rate at low temperature and decreased performance at high temperature, and easy occurrence of hydrocarbon poisoning. The catalyst prepared according to the present invention by using a small pore molecular sieve material with a silicon-aluminum ratio and adding yttrium as a second active component exhibits excellent catalytic activity for $NO_x$ at low and high temperatures, has a wide active temperature window, high hydrothermal stability and good resistance to hydrocarbon poisoning.

In order to achieve the purpose, the invention provides the following technical solutions.

The invention provides a molecular sieve SCR catalyst and a preparation method comprising the steps of:

(1) copper solution blending: heating deionized water to 60-90 °C, and adding a soluble copper salt and an additive to stir and dissolve the same to prepare a copper solution;

(2) ion exchange: heating the deionized water to 60-90 °C, adding a soluble yttrium salt to stir and dissolve the same, maintaining the temperature at 60-90 °C, adding a molecular sieve with a silicon-aluminum ratio of ≤24 and continuously stirring for 0.5-5 h; maintaining the temperature at 60-90 °C, adding the copper solution prepared in step (1) and continuously stirring the mixture for 1-10 h;

(3) slurrying: cooling the solution prepared in step (2), adding an adhesive, stirring and ball-milling the mixture, and standing for 0.5-5 h to obtain a slurry; and (4) coating and calcinating: coating the slurry prepared in step (3) onto a catalyst support, drying and then calcining the same in air at 300-600 °C for 1-6 h to obtain a molecular sieve SCR catalyst.

The present invention also provides another solution in which a molecular sieve SCR catalyst and a preparation method comprising the steps of:

(1) copper solution blending: heating deionized water to 20-90 °C, and adding a soluble copper salt and an additive to stir and dissolve the same to prepare a copper solution;

(2) ion exchange: heating the deionized water to 20-90 °C, adding a soluble yttrium salt to stir and dissolve the same, maintaining the temperature at 20-90 °C, adding a molecular sieve with a silicon-aluminum ratio of ≤24 and continuously stirring the same; maintaining the temperature at 20-90 °C, adding the copper solution prepared in step (1) and continuously stirring to perform ion exchange;

(3) slurrying: cooling the solution prepared in step (2), adding an adhesive, stirring and ball-milling, and standing to obtain a slurry;

(4) coating and calcinating: coating the slurry prepared in step (3) on a catalyst support, drying and calcining the same to obtain a molecular sieve SCR catalyst.

The present invention provides a molecular sieve SCR catalyst and a preparation method. The molecular sieve SCR catalyst comprises a first active component Cu, a second active component Y, a small-pore molecular sieve and a catalyst support. The additive may change the potential of Cu ions in a solution, increase the "attachment" rate of Cu ions on the surface of the molecular sieve and improve the uniformity of the slurry. During the preparation, the first active component, the additive, the small pore molecular sieve, the second active component, the adhesive and water are mixed into a slurry by a slurry-coating one-step method, which is performed with coating and drying to obtain the molecular sieve SCR catalyst.

As a preferred solution of the present invention, the molecular sieve is one of H-SSZ-13, H-SSZ-39 or a mixture of the two; and more preferably, the silicon-aluminum ratio in the molecular sieve is (6-22):1.

As a preferred solution of the present invention, the soluble copper salt comprises one or more of copper sulfate, copper nitrate, copper acetate and copper chloride; the additive is one of citric acid, glycine, humic acid and gluconolactone; and the soluble yttrium salt comprises yttrium nitrate.

As a preferred solution of the present invention, in step (1), the mass ratio of the additive to the copper element is (0.2-2.5): 1 based on the copper element in the soluble copper salt.

As a preferred solution of the present invention, in the catalyst, a first active component is calculated by a copper element, and the mass ratio of the copper element to the molecular sieve is <10 wt %; and a second active component is calculated by a yttrium element, and the mass ratio of the yttrium element to the molecular sieve is <2.5 wt %. More preferably, a first active component is calculated by a copper element, and the mass ratio of the copper element to the molecular sieve is <6.8 wt %; and a second active component is calculated by a yttrium element, and the mass ratio of the yttrium element to the molecular sieve is <0.5 wt %.

As a preferred solution of the present invention, in the catalyst, a first active component is calculated by a copper element, and the mass ratio of the copper element to the molecular sieve is <5.5 wt %; and a second active component is calculated by a yttrium element, and the mass ratio of the yttrium element to the molecular sieve is <2.5 wt %.

As a preferred embodiment of the present invention, in step (2), the soluble yttrium salt is subjected to ion exchange at a temperature of 70-80 °C and the soluble copper salt is subjected to ion exchange at a temperature of 70-80 °C.

As a preferred solution of the present invention, in step (2), the time for performing yttrium ion exchange after adding the molecular sieve is 1-3 h; and the time for performing copper ion exchange after adding the copper solution prepared in step (1) is 2-4 h. As a preferred solution of the present invention, the adhesive is one or more of a silica sol, an aluminum sol and a zirconium sol; and the mass of the adhesive after being calcined to an oxide is 2-20 wt % of the mass of the molecular sieve; and more preferably, the adhesive after being calcined to an oxide has a mass of 5-15 wt % of the mass of the molecular sieve.

As a preferred solution of the present invention, a catalyst support is one of a cordierite support, a silicon carbide support and a metal support.

As a preferred solution of the present invention, in step (3), the standing time is 1-2 hours.

As a preferred solution of the present invention, in step (3), the solid content of the slurry is 30-60%.

As a preferred solution of the present invention, in step (4), the coating amount of the slurry is 50-200 g/L.

As a preferred solution of the present invention, in step (4), the drying is rapid drying on a dryer. By the method of rapid drying after coating, it reduces the effect of the acidity enhancement of the slurry on the dealumination of the molecular sieve framework during the drying process, which is beneficial for improving the low-temperature catalytic performance and stability of the catalyst.

As a preferred solution of the present invention, in the step (4), the calcination temperature is 350-450 °C for 2-4 hours.

Another aspect of the of the present invention provides a molecular sieve SCR catalyst prepared by the preparation method described above.

The invention has the following beneficial effects compared to prior art.

In the preparation method of the molecular sieve SCR catalyst of the present invention, a small-pore molecular sieve material with a relatively low silicon-aluminum ratio is used. The dispersion of the first active component Cu on the surface of the molecular sieve and the acid density of the catalyst may be adjusted by the additive when adding the second active component yttrium, so as to improve the catalytic activity and hydrocarbon resistance of the catalyst, thereby achieving that the catalyst has an excellent catalytic activity for $NO_x$ at a relatively low silicon-aluminum ratio and at a low temperature and a high temperature, and has a wide active temperature window, a high hydrothermal stability and a relatively good hydrocarbon resistance. At the same time, the slurrying-coating one-step method is adopted in the present invention, which shortens and simplifies the preparation method and greatly reduces the cost.

DETAILED DESCRIPTION

Figure 1:
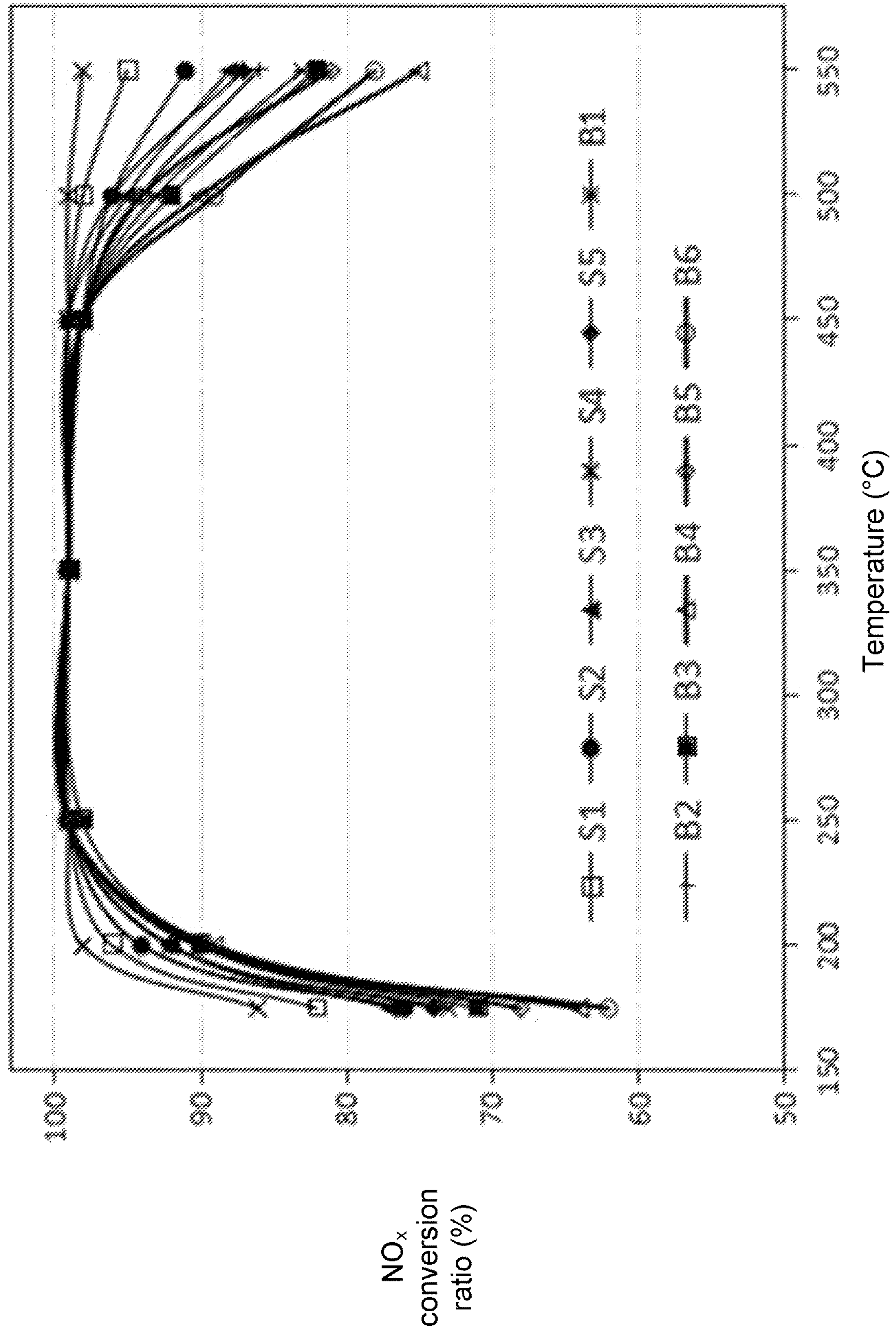
FIG. 1 is a graph of $NO_x$ conversion ratios by a catalyst in examples of the invention and comparative examples.

Hereinafter, the present invention will be described in further detail with reference to experimental examples and detailed description. However, it should not be understood that the scope of the above-described subject matter of the present invention is limited to the following examples. All the technologies achieved on the basis of the invention fall within the scope of the invention.

Example 1

(1) Preparation of copper solution: 50 g of deionized water was heated to 60 °C, and 19.03 g of copper nitrate trihydrate and 6.05 g of citric acid were added and dissolved with stirring to prepare a copper solution.
(2) Ion exchange: 200 g of deionized water was heated to 80 °C, 6.03 g of yttrium nitrate hexahydrate was added, stirred and dissolved completely, 140 g of H-SSZ-13 with a silicon-aluminum ratio of 13 was added while maintaining the temperature at 80 °C and continuously stirred for 3 h to perform ion exchange, and the copper solution prepared in step (1) was added while maintaining the temperature at 80 °C and continuously stirred for 4 h.
(3) Slurrying: the solution after ion exchange in step (2) was cooled to room temperature, 28 g of a silicon solution with a concentration of 30% was added, stirred and ball-milled, and stood for 1 h to obtain a slurry.
(4) Coating and calcinating: the slurry prepared in step (3) was coated on a cordierite support in a coating amount of 140 g/L, dried rapidly at 130 °C using a dryer, and then calcined in air at 500 °C for 3 h to obtain a molecular sieve SCR catalyst S1.

The cordierite supports used in the present invention were all cylindrical permeable supports with q 25.4 mm*50.8 mm and a 400 cpsi mesh.

Example 2

(1) Preparation of copper solution: 100 g of deionized water was heated to 80 °C, and 20.30 g of copper acetate, 8.60 g of citric acid and water were added and dissolved at 80 °C with stirring to prepare a copper solution.
(2) Ion exchange: 220 g of deionized water was heated to 80 °C, 3.88 g of yttrium nitrate hexahydrate was added, stirred and dissolved completely, 180 g of H-SSZ-13 was added while maintaining the temperature at 80 °C and stirred continuously for 1 h to perform ion exchange, and the copper solution prepared in step (1) was added while maintaining the temperature at 70 °C and stirred continuously for 3 h.
(3) Slurrying: the solution after ion exchange in step (2) was cooled to room temperature, 36 g of a silicon solution with a concentration of 30% was added, stirred and ball-milled, and stood for 1 h to obtain a slurry.
(4) Coating and calcinating: the slurry prepared in step (3) was coated on a cordierite support in a coating amount of 140 g/L, dried rapidly at 130 °C using a dryer, and then calcined in air at 450 °C for 2 h to obtain a molecular sieve SCR S2.

Example 3

(1) Preparation of copper solution: 55 g of deionized water was heated to 70 °C, and 21.88 g of copper sulfate pentahydrate and 7.88 g of glycine were added and dissolved with stirring to prepare a copper solution.
(2) Ion exchange: 300 g of deionized water was heated to 70 °C, 8.62 g of yttrium nitrate hexahydrate was added to stir and dissolve completely, 200 g of H-SSZ-13 with a silicon-aluminum ratio of 20 was added while maintaining the temperature at 70 °C and continuously stirring for 6 h to perform ion exchange, and the copper solution prepared in step (1) was continuously stirred and added while maintaining the temperature at 80 °C, and continuously stirred for 4 h.
(3) Slurrying: the solution after ion exchange in step (2) was cooled to room temperature, 57 g of a zirconium solution with a concentration of 21% was added, stirred and ball-milled, and stood for 2 h to obtain a slurry.
(4) Coating and calcinating: the slurry prepared in step (3) was coated on a cordierite support in a coating amount of 140 g/L, dried rapidly at 120 °C using a dryer, and then calcined in air at 500 °C for 3 h to obtain a molecular sieve SCR catalyst S3.

Example 4

(1) Preparation of copper solution: 50 g of deionized water was heated to 60 °C, and 30.80 g of copper nitrate trihydrate and 9.79 g of citric acid were added and dissolved with stirring to prepare a copper solution.
(2) Ion exchange: 200 g of deionized water was heated to 80 °C, 10.34 g of yttrium nitrate hexahydrate was added, stirred and dissolved completely, 160 g of H-SSZ-13 with a silicon-aluminum ratio of 8.5 was added while maintaining the temperature at 80 °C and continuously stirring for 4 h to perform ion exchange, and the copper solution prepared in step (1) was continuously stirred and added while maintaining the temperature at 80 °C, and continuously stirred for 2 h.
(3) Slurrying: the solution after ion exchange in step (2) was cooled to room temperature, 32 g of a silicon solution with a concentration of 30% was added, stirred and ball-milled, and stood for 1 h to obtain a slurry.
(4) Coating and calcinating: the slurry prepared in step (3) was coated on a cordierite support in a coating amount of 140 g/L, dried rapidly at 130 °C using a dryer, and then calcined in air at 500 °C for 3 h to obtain a molecular sieve SCR catalyst S4.

Example 5

(1) Preparation of copper solution: 70 g of deionized water was heated to 80 °C, and 16 g of copper acetate and 6.14 g of citric acid were added and dissolved with stirring to prepare a copper solution.
(2) Ion exchange: 240 g of deionized water was heated to 80 °C, 0.62 g of yttrium nitrate hexahydrate was added, stirred and dissolved completely, 160 g of H-SSZ-39 with a silicon-aluminum ratio of 17 was added while maintaining the temperature at 80 °C and continuously stirring for 1 h to perform ion exchange, and the copper solution prepared in step (1) was continuously stirred and added while maintaining the temperature at 80 °C, and continuously stirred for 4 h.
(3) Slurrying: the solution after ion exchange in step (2) was cooled to room temperature, 32 g of a silicon solution with a concentration of 30% was added, stirred and ball-milled, and stood for 1 h to obtain a slurry.
(4) Coating and calcinating: the slurry prepared in step (3) was coated on a cordierite support in a coating amount of 140 g/L, dried rapidly at 130 °C using a dryer, and then calcined in air at 500 °C for 3 h to obtain a molecular sieve SCR catalyst S5.

Comparative Example 1

(1) Ion exchange: 250 g of deionized water was heated to 80 °C with continuous stirring, 140 g of H-SSZ-13 with a silicon-aluminum ratio of 13 was added with continuous stirring, and 19.03 g of copper nitrate trihydrate was added for ion exchange for 4 h.

The other preparation steps were the same as steps (3) and (4) of Example 1 to obtain a molecular sieve SCR catalyst B1.

Comparative Example 2

(1) Preparation of copper solution: 50 g of deionized water was heated to 60 °C, and 19.03 g of copper nitrate trihydrate and 6.05 g of citric acid were added and dissolved with stirring to prepare a copper solution.

(2) Ion exchange: 200 g of deionized water was heated to 80 °C with continuous stirring, 140 g of H-SSZ-13 with a silicon-aluminum ratio of 13 was added, and the copper solution prepared in step (1) was added with continuous stirring and stirred for 4 h.

The other preparation steps were the same as steps (3) and (4) of Example 1 to obtain a molecular sieve SCR catalyst B2.

Comparative Example 3

(1) Preparation of copper solution: 55 g of deionized water was heated to 80 °C, and 21.88 g of copper sulfate pentahydrate and 7.88 g of glycine were added and dissolved with stirring to prepare a copper solution.

(2) Ion exchange: 305 g of deionized water was heated to 80 °C, 200 g of H-SSZ-13 with a silicon-aluminum ratio of 20 was added with constant stirring, and the copper solution prepared in step (1) was added and stirred for 4 h.

The other preparation steps were the same as steps (3) and (4) of Example 3 to obtain a molecular sieve SCR catalyst B3.

Comparative Example 4

(1) Preparation of copper solution: 50 g of deionized water was heated to 60 °C, and 30.80 g of copper nitrate trihydrate and 9.79 g of citric acid were added and dissolved with stirring to prepare a copper solution.

(2) Ion exchange: 250 g deionized water was heated to 80 °C, 160 g of H-SSZ-13 with a silicon-aluminum ratio of 8.5 was added, and 30.80 g of copper nitrate trihydrate was added and stirred for 2 h.

The other preparation steps were the same as steps (3) and (4) of Example 5 to obtain a molecular sieve SCR catalyst B4.

Comparative Example 5

(1) Ion exchange milling: 210 g of deionized water was heated to 80 °C, 140 g of H-SSZ-13 with a silicon-aluminum ratio of 13 and 19.03 g of copper nitrate trihydrate were added and continuously stirred for 6 h, then filtered, washed and dried to a powder, the Cu content in the resulting product being 3.6 wt %.

(2) slurrying: 120 g of the powder after ion exchange in step (1), 180 g of water, 6.03 g of yttrium nitrate, and 28 g of a silicon solution with a concentration of 30% were subjected to stirring and ball-milling, standing for 1 h to obtain a slurry;

The other preparation steps were the same as steps (3) and (4) of Example 5 to obtain a molecular sieve SCR catalyst B5.

Comparative Example 6

(1) Preparation of copper solution: 50 g of deionized water was heated to 60 °C, and 19.03 g of copper nitrate trihydrate and 6.05 g of citric acid were added and dissolved with stirring to prepare a copper solution.

(2) Ion exchange: 200 g of deionized water was heated to 80 °C, 6.03 g of yttrium nitrate hexahydrate was added, stirred and dissolved completely, 140 g of H-SSZ-13 with a silicon-aluminum ratio of 27 was added while maintaining the temperature at 80 °C and continuously stirred for 3 h to perform ion exchange, and the copper solution prepared in step (1) was added while maintaining the temperature at 80 °C and continuously stirred for 4 h.

The other preparation steps were the same as steps (3) and (4) of Example 1 to obtain a molecular sieve SCR catalyst B6.

The molecular sieve SCR catalysts S1-S5 prepared in Examples 1-5 and the molecular sieve SCR catalysts B1-B6 prepared in Comparative Examples 1-6 were subjected to $NO_x$ conversion tests and HC conversion tests on a fixed bed reactor. The simulated gas composition for testing $NO_x$ conversion was [NO]—[$NH_3$]=250 ppm, [$O_2$]=10%, [$H_2O$]=8%, and $N_2$ as a balance gas. The simulated gas composition for testing HC conversion was [NO]—[$NH_3$]=250 ppm, [$C_3H_3$]=250 ppm, [$O_2$]=10%, [$H_2O$]=8%, and $N_2$ as a balance gas. The space velocity was 60000 $h^{-1}$, and the reaction temperature was 175-550 °C during the test of $NO_x$ conversion and HC conversion. The gas components used were all subjected to infrared detection. The $NO_x$ conversion test results are summarized in Table 1 and the HC conversion test results are summarized in Table 2 in conversion units of %. The catalysts prepared in Example 1, Example 3, Comparative Examples 1-2, and Comparative Examples 5-6 were hydrothermally aged at 750 °C for 50 h. After the aging was completed, the $NO_x$ conversion was tested under the above-mentioned test conditions. The test results are statistically shown in Table 3. Tables 1, 2 and 3 are prepared into FIGS. 1, 2 and 3, respectively.

TABLE 1

Conversion ratio of molecular sieve SCR catalysts S1-S5, B1-B6 on $NO_x$

| Sequence number | 175 °C | 200 °C | 250 °C | 350 °C | 450 °C | 500 °C | 550 °C |
|---|---|---|---|---|---|---|---|
| S1 | 82 | 96 | 99 | 99 | 99 | 98 | 95 |
| S2 | 76 | 94 | 99 | 99 | 98 | 96 | 91 |
| S3 | 77 | 92 | 99 | 99 | 99 | 95 | 88 |
| S4 | 86 | 98 | 99 | 99 | 99 | 99 | 98 |
| S5 | 74 | 92 | 99 | 99 | 99 | 96 | 87 |
| B1 | 73 | 92 | 99 | 99 | 98 | 93 | 83 |
| B2 | 76 | 94 | 99 | 99 | 98 | 94 | 86 |
| B3 | 71 | 90 | 98 | 99 | 98 | 92 | 82 |
| B4 | 64 | 89 | 99 | 99 | 98 | 90 | 75 |
| B5 | 68 | 90 | 99 | 99 | 98 | 94 | 81 |
| B6 | 62 | 90 | 99 | 99 | 98 | 89 | 78 |

TABLE 2

Conversion ratio of molecular sieve SCR catalysts S1-S5, B1-B6 on HC

| Sequence number | 175 °C | 200 °C | 250 °C | 350 °C | 450 °C | 500 °C | 550 °C |
|---|---|---|---|---|---|---|---|
| S1 | 75 | 93 | 98 | 97 | 98 | 96 | 92 |
| S2 | 76 | 94 | 99 | 99 | 98 | 96 | 91 |
| S3 | 67 | 90 | 98 | 97 | 98 | 94 | 84 |
| S4 | 66 | 88 | 96 | 96 | 96 | 95 | 92 |
| S5 | 63 | 90 | 98 | 96 | 99 | 94 | 85 |
| B1 | 68 | 90 | 96 | 95 | 96 | 91 | 81 |
| B2 | 70 | 92 | 96 | 95 | 96 | 92 | 83 |
| B3 | 65 | 88 | 96 | 94 | 96 | 90 | 80 |
| B4 | 52 | 86 | 97 | 95 | 96 | 87 | 74 |
| B5 | 61 | 87 | 96 | 94 | 96 | 92 | 80 |
| B6 | 54 | 87 | 97 | 97 | 97 | 87 | 78 |

TABLE 3

Conversion ratio of molecular sieve SCR catalysts S1, S3, B1-B2 and B5-B6 on $NO_x$ after aging at 750° C. @50 h

| Sequence number | 175 °C | 200 °C | 250 °C | 350 °C | 450 °C | 500 °C | 550 °C |
|---|---|---|---|---|---|---|---|
| S1 | 62 | 87 | 98 | 99 | 98 | 95 | 85 |
| S3 | 70 | 94 | 97 | 99 | 97 | 91 | 87 |
| B1 | 53 | 82 | 97 | 99 | 97 | 89 | 73 |
| B2 | 57 | 85 | 97 | 99 | 97 | 91 | 74 |
| B5 | 58 | 84 | 98 | 99 | 98 | 93 | 80 |
| B6 | 54 | 80 | 90 | 98 | 86 | 75 | 65 |

Figure 2:
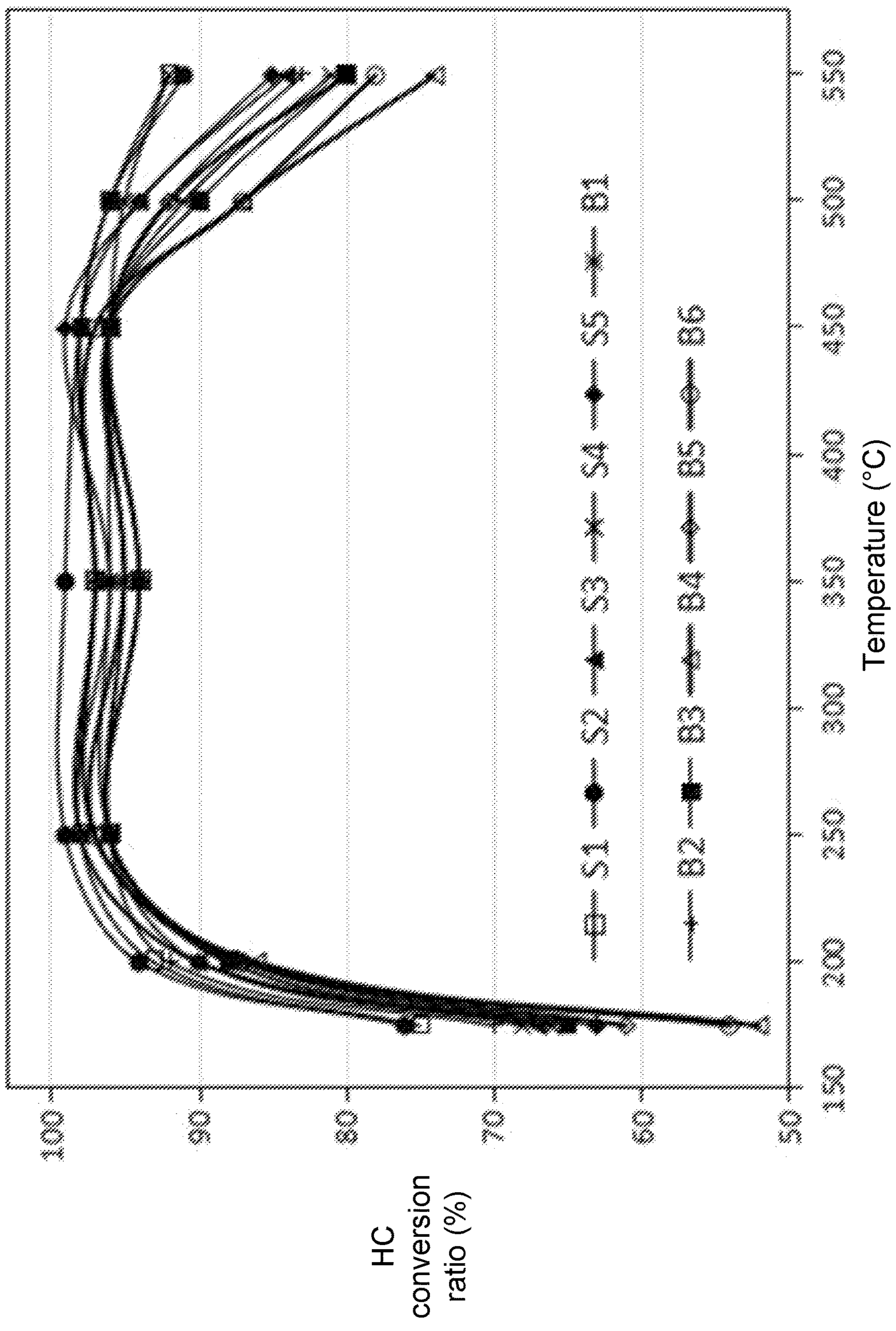
FIG. 2 is a graph of HC conversion ratios by a catalyst in examples of the invention and comparative examples.

It can be seen from FIG. 1 that at a low temperature of 175 °C, the conversion rate of the molecular sieve SCR catalysts S1-S6 on $NO_x$ is 74-86%. At a high temperature of 550 °C, the conversion rate of the molecular sieve SCR catalysts S1-S6 on $NO_x$ is 87-98%. At 175 °C, the activity of Example 1 was increased by 6-20% compared with Comparative Examples 1-2. At 550 °C, the activity of Example 1 was increased by 9-17% compared with Comparative Examples 1-2, indicating that the catalyst has good catalytic activity for $NO_x$ at both low temperature and high temperature. In Comparative Example 1, no additive was added. In Comparative Examples 2-4, no second active component Y was added. In Comparative Example 5, Y was not added by ion exchange. In Comparative Example 6, the conversion rate on $NO_x$ was lower with the molecular sieve having a silicon-aluminum ratio of 27. In FIG. 2, the catalyst is tested under an atmosphere of 250 ppm $C_3H_6$. The conversion rate of the molecular sieve SCR catalysts S1-S6 on HC is 63-76% at a low temperature of 175 °C, and the conversion of the molecular sieve SCR catalysts S1-S6 on HC is 84-92% at a high temperature of 550 °C. Example 1 shows a 5-21% increase in activity compared to Comparative Examples 1-2 at 175 °C. Example 1 shows a 9-14% increase in activity compared to Comparative Examples 1-2 at 550 °C, indicating that the catalyst of the present invention has good resistance to hydrocarbon poisoning.

Figure 3:
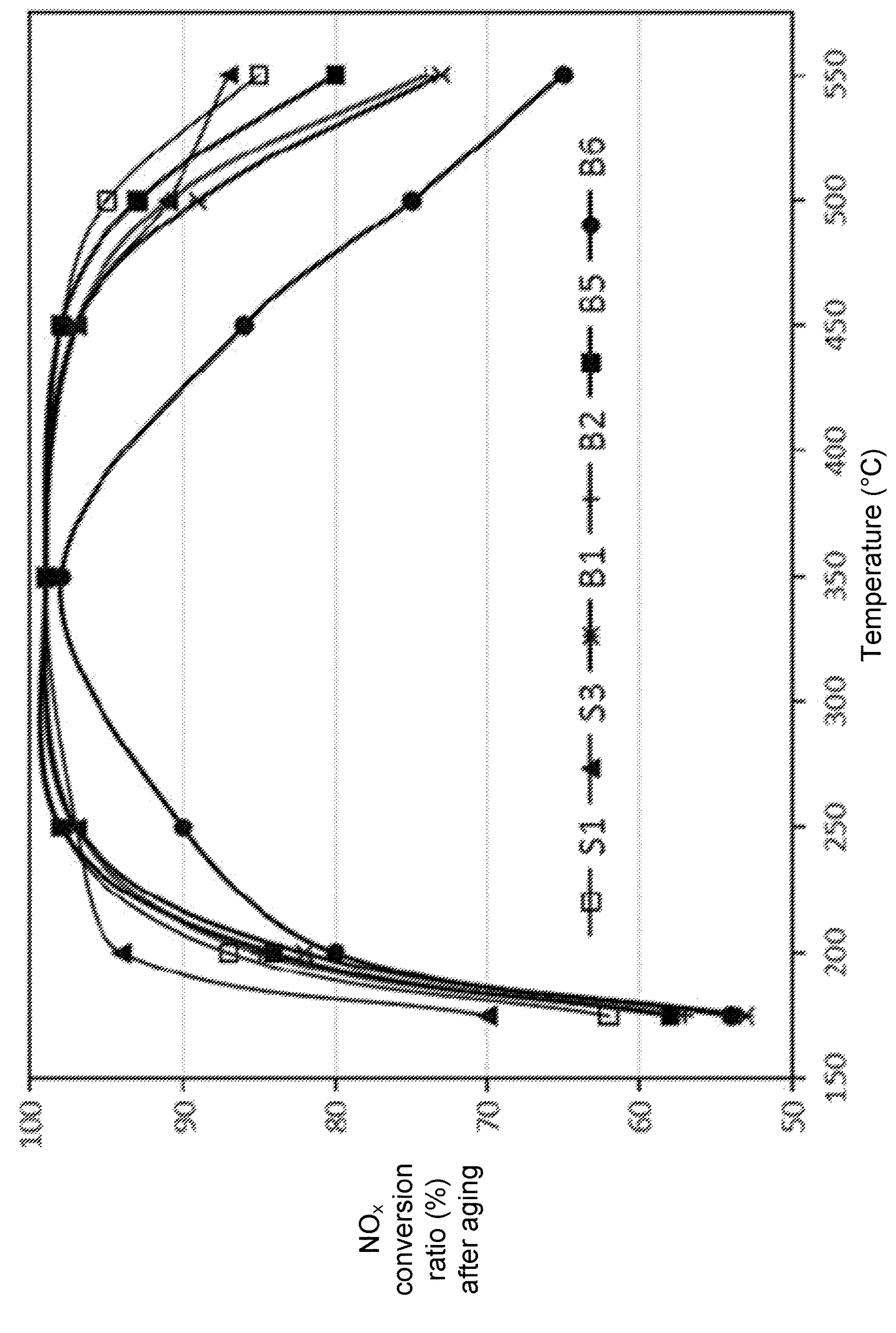
FIG. 3 is a graph of $NO_x$ conversion ratios after hydrothermal aging at 750 °C@50 h.

As can be seen from FIG. 3, the $NO_x$ conversion performance and the reaction temperature window after hydrothermal aging of the catalyst at 750 °C for 50 h are significantly better than those of Comparative Examples 1 and 2, Comparative Examples 5 and 6, Example 1 and Example 3, indicating that the molecular sieve SCR catalyst prepared according to the present invention has good hydrothermal stability.

In the present invention, a small-pore molecular sieve material with a relatively low silicon-aluminum ratio is used. The dispersion of the first active component Cu on the surface of the molecular sieve and the acid density of the catalyst may be adjusted by the additive when adding the second active component yttrium, so as to improve the catalytic activity and hydrocarbon resistance of the catalyst, thereby achieving that the catalyst has an excellent catalytic activity for $NO_x$ at a relatively low silicon-aluminum ratio and at a low temperature and a high temperature, and has a wide active temperature window, a high hydrothermal stability and a relatively good hydrocarbon resistance.

The above mentioned are only preferred embodiments of the invention and is not intended to limit the invention. Any modification, equivalent substitution and improvement made within the spirit and principles of the invention shall be covered by the protection of the invention.

The invention claimed is:

1. A preparation method for a molecular sieve SCR catalyst, comprising the steps of:

(1) copper solution blending: heating deionized water to 60-90 °C, and adding a soluble copper salt and an additive to stir and dissolve the same to prepare a copper solution;

(2) ion exchange: heating the deionized water to 60-90 °C, adding a soluble yttrium salt to stir and dissolve the same, maintaining the temperature at 60-90 °C, adding a molecular sieve with a silicon-aluminum ratio of ≤24 and continuously stirring for 0.5-5 h; maintaining the temperature at 60-90 °C, adding the copper solution prepared in step (1) and continuously stirring the mixture for 1-10 h;

(3) slurrying: cooling the solution prepared in step (2), adding an adhesive, stirring and ball-milling the mixture, and standing for 0.5-5 h to obtain a slurry; and (4) coating and calcinating: coating the slurry prepared in step (3) onto a catalyst support, drying and then calcining in air at 300-600 °C for 1-6 h to obtain a molecular sieve SCR catalyst.

2. The preparation method for the molecular sieve SCR catalyst according to claim 1, wherein the molecular sieve is one of H-SSZ-13, H-SSZ-39 or a mixture of the two; and the silicon-aluminum ratio in the molecular sieve is 6-22:1.

3. The preparation method for the molecular sieve SCR catalyst according to claim 1, wherein the soluble copper salt comprises one or more of copper sulfate, copper nitrate, copper acetate and copper chloride; the additive is one of citric acid, glycine, humic acid and gluconolactone; and the soluble yttrium salt comprises yttrium nitrate.

4. The preparation method for the molecular sieve SCR catalyst according to claim 3, wherein in the catalyst, a first active component is calculated by a copper element, and the mass ratio of the copper element to the molecular sieve is <5.5 wt %; and a second active component is calculated by a yttrium element, and the mass ratio of the yttrium element to the molecular sieve is <2.5 wt %.

5. The preparation method for the molecular sieve SCR catalyst according to claim 3, wherein in step (1), the mass ratio of the additive to the copper salt is 0.2-2.5:1.

6. The preparation method for the molecular sieve SCR catalyst according to claim 1, wherein in step (2), the time for performing yttrium ion exchange after adding the molecular sieve is 1-3 h; and the time for performing copper ion exchange after adding the copper solution prepared in step (1) is 2-4 h.

7. The preparation method for the molecular sieve SCR catalyst according to claim 1, wherein the adhesive is one or more of a silica sol, an aluminum sol and a zirconium sol, and the mass of the adhesive after being calcined to an oxide is 2-20 wt % of the mass of the molecular sieve.

8. The preparation method for the molecular sieve SCR catalyst according to claim 1, wherein a catalyst support is one of a cordierite support, a silicon carbide support and a metal support.

9. The preparation method for the molecular sieve SCR catalyst according to claim 1, wherein in step (3), a solid content of the slurry is 30-60%, and a coating amount of the slurry is 50-200 g/L.

10. A molecular sieve SCR catalyst, wherein the catalyst is prepared by the preparation method as claimed in claim 1.

* * * * *